Figure 1:
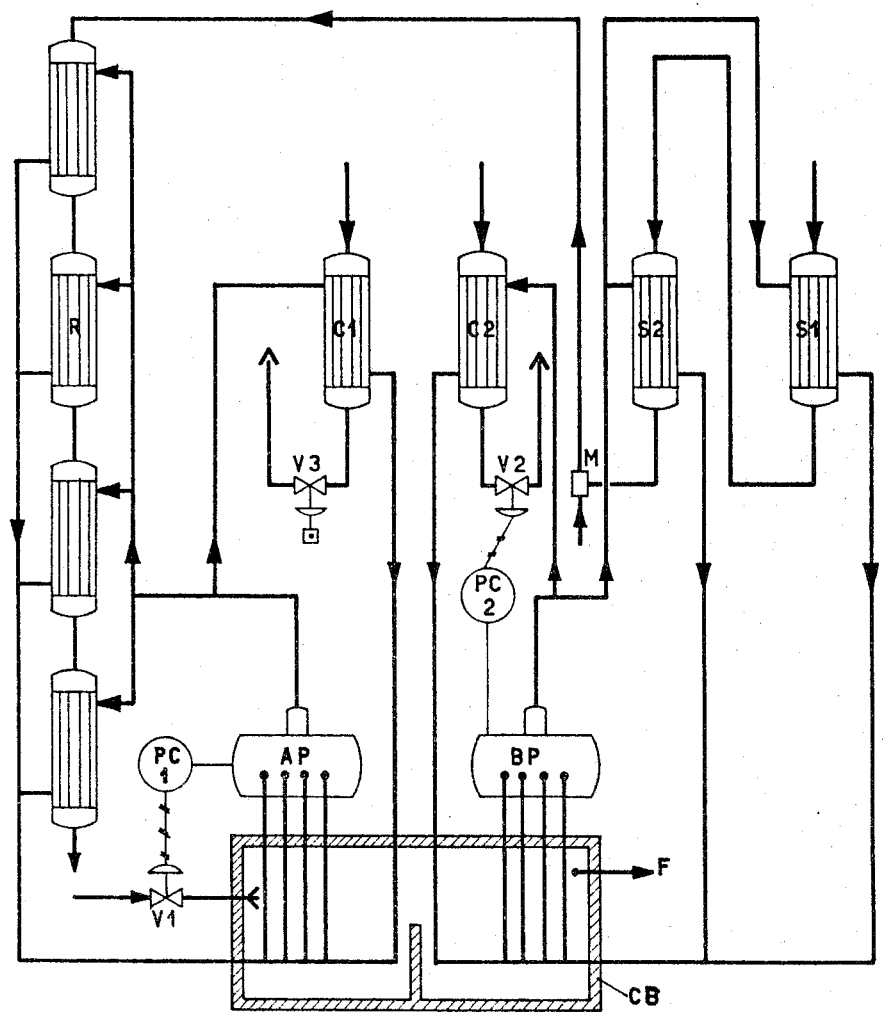

Nov. 1, 1966 P. BARRETTA 3,282,652
APPARATUS FOR PYROLYSIS OF DICHLOROETHANE
Filed May 15, 1963

INVENTOR.

Pasquale Barretta

3,282,652
APPARATUS FOR PYROLYSIS OF DICHLOROETHANE

Pasquale Barretta, Terni, Italy, assignor to Montecatini Societa Generale per l'Industria Mineraria e Chimica, Milan, Italy
Filed May 15, 1963, Ser. No. 280,751
Claims priority, application Italy, May 17, 1962, 9,827/62
2 Claims. (Cl. 23—262)

My invention relates to apparatus for the pyrolysis of dichloroethane to yield vinyl chloride. More particularly, it relates to a dichloroethane pyrolysis process wherein the needed heat is supplied by mercury vapors.

Heretofore, the heating required for such pyrolysis has been obtained directly by combustion and transforming the heat to the dichloroethane by radiation and convection, by the expedient of placing the reactor tubes in which the pyrolysis occurs inside the combustion chamber or in connection thereto.

Such heating systems do not afford an efficient thermal control of the reaction. Good heating control is basic in the dichloroethane pyrolysis inasmuch as lack of control results in excess formation of carbon black and the deposition of carbon in the reactor tubes.

The dichloroethane pyrolysis, when it is controlled and kept at temperatures in the range between 400° and 500° C., leads to the formation of vinyl chloride and hydrochloric acid. As the temperature is increased beyond this range, the decomposition becomes more and more drastic until major amounts of carbon black which is the end product of the decomposition are obtained. The percentage of carbon black increases sharply as the temperature rises. The carbon black and similar carbon deposits are formed upon the walls of the reactor tubes, and the deposition is promoted by overheating these tubes.

Once formed, the first deposit of carbon black decreases the thermal transmission coefficient. This necessitates, if the pyrolysis is to be kept constant, an increase in temperature of the heating fluid. Such an increase results in a further temperature increase at the tube walls and new formation of carbon residues. This phenomenon is progressive. The carbon black deposits soon obstruct the passage of gases through the reactor. In addition, overheating of the walls also increases the corrosion rate of the tubes by the hydrochloric acid within the tubes and by the combustion gases on the outside of the tubes.

Further, as the corrosive action of the hydrochloric acid proceeds, the formation of metal chlorides increases. These catalyze the formation of undesirable byproducts. The reaction yield decreases when the chlorides are conveyed from the reactor together with the pyrolysis products (unconverted dichloro-ethane, vinyl chloride, hydrochloric acid in addition to the other byproducts), and after the separation operations the metal chlorides are found in the unreacted dichloroethane which is returned to the reactor. Such further recycling of these undesired byproducts further reduces the yield and promotes corrosive action.

The reaction in the known apparatus, with reaction pipes directly contacting the combustion chamber, involves further drawbacks including a lengthy starting phase owing to the thermal inertia of the system. This inertia also limits the controllability and regulation of the reactor operation.

Optimally the heating control of a reactor for the pyrolysis of dichloroethane should provide uniform temperatures in all of the reactor tubes corresponding to the optimum temperature for the pyrolysis and should avoid overheating of the reactor heat exchanger tubes.

It is an object of my invention to provide a process for the pyrolysis of dichloroethane that operates completely with the optimum temperature range for the conversion to vinyl chloride.

It is a further object of the invention to provide a novel heat exchange medium which limits the temperature at the exchanger surface so that minimal amounts of carbon black and metal halides are formed.

Another object of my invention is to provide an apparatus that will permit the foregoing process to proceed continuously with minimal external intervention and adjustment and negligible down-time for cleaning and tube replacement.

The process according to the invention is based on the use of heated mercury vapors as the thermal fluid for initiating, maintaining and controlling the pyrolysis of the dichloroethane, said heating occurring in two stages, the first stage being a preheating to a temperature in the range from 50° below to immediately below the initiation temperature for the pyrolysis, and the second stage being a flash heating to the narrow optimum range for the pyrolysis. Control of the second heating stage and prevention of large-scale formation of carbon black are achieved by injecting small quantities of oxidizing fluids into the heated dichloroethane stream. These fluids additionally lower the temperature required for the initiation of the pyrolysis.

According to further features of the invention, the process is performed in apparatus which comprises two evaporators or boilers for the production of mercury vapors at two different temperatures, controlled by condensers, and apparatus for the exchange of the contained heat from the mercury vapors to the dichloroethane vapors via a mercury vapor/mercury liquid/metal tube/dichloroethane vapor system. That is, the mercury vapors condense on the surface of the heat exchanger tubes, which then transfer the heat from the liquid mercury to the dichloroethane. Further, the apparatus according to the invention is preferably provided with reactor temperature controls operating with condensers to provide quick and easy starting with minimal thermal lag.

Figure 2:
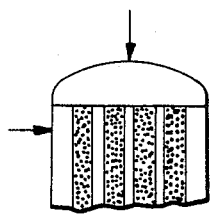

The process and apparatus of this invention will be further described in connection with the accompanying drawing in which:

FIG. 1 is a schematic layout of the unit operations and equipment related thereto, and FIG. 2 is a partial section through the second preheater of FIG. 1.

The illustrated apparatus comprises two evaporators or boilers AP and BP for the production of mercury vapors. Boiler AP is kept at high pressure and high temperature (9–13 atmospheres, 520–550° C.), and boiler BP at low pressure and low temperature (2–5 atmospheres, 420–470° C.). Shown at CB is a combustion chamber which is supplied with fuel, such as naphtha, through a control valve VI. The combustion gases leave the combustion chamber through a stack, this being schematicaly indicated at F. The low temperature, low pressure mercury vapor from boiler BP supplies heat to two preheaters S1 and S2 for the dichloroethane. When the mercury vapors are condensed they return from preheaters S1 and S2 to boiler BP.

High-pressure mercury vapor from boiler AP supplies heat to pyrolysis reactors R, preferably 4 to 8 reactors in series. The mercury vapors, when condensed, return to boiler AP.

Air-cooled condensers C1 and C2 are used for putting the boilers under pressure, when starting the operation, and for providing fine adjustment of pressure in the boilers with minimal air delivery during normal operation. Such adjustment is achieved by producing in the boilers AP and BP a slight excess of vapor and conveying the excess to the respective condensers wherein a little air delivery is passed. This is suitably fixed in the high-pressure condenser C1, and the pressure in the high-pressure boiler AP is adjusted by a controller $PC_1$ operating the fuel inlet valve VI. The pressure of the low-pressure boiler BP is adjusted through a controller $PC_2$ operating a valve V2 in the air line of the low-pressure condenser C2.

The pressure control apparatus $PC_1$ controls the pressure of boiler AP through the fuel inlet valve VI, after the valve V3 in the air duct of condenser C1 has been set to the most suitable position. The pressure control of boiler BP is accomplished by the fact that the pressure controller $PC_2$ responds to variations in boiler pressure and accordingly operates the valve V2 in the air duct of condenser C2.

Dichloroethane at 1 to 4 atmospheres, vaporized and heated at a temperature in the range between 100 and 160° C., is conveyed into preheaters S1 and S2 leaving them at 350° to 400° C. in the stage of incipient decomposition. After an oxidizing fluid is injected in a mixer M for lowering the temperature needed for pyrolysis, the dichloroethane vapors pass into the reactors R where the cracking or pyrolysis occurs at temperatures of 400 to 500° C. The cracking products then pass to the other parts of the plant (not indicated) for separation of the vinyl chloride from the hydrochloric acid and recovery of the unreacted dichloroethane for recycling.

The following will illustrate the advantages of the invention in its various aspects, and will show the expedient manner in which the different problems occurring in the pyrolysis operation have been efficiently overcome.

As previously stated, a basic problem in such processes is that of proper temperature control of the reactors, which should result in (1) avoiding overheating of the walls of the tubes and (2) assure uniform temperature in all of the reactor tubes equal to the optimum temperature for the pyrolysis reaction. These objectives are conjointly achieved by the processing apparatus according to the invention.

The thermal difference between the heated fluid (dichloroethane) and the heating fluid (mercury vapor which condenses) is reduced to a minimum due to the high overall coefficient of thermal transmission of the liquid metal. In other words, the tube-wall temperature is only slightly higher than the temperature of the dichloroethane passing therethrough and is only a little lower than that of the mercury vapor and mercury liquid. Since the transmission coefficient of liquid mercury from the mercury vapor which condenses on the tube walls is very high (in the order of 100 times that of the combustion gases previously used), the heat transfer to the dichloroethane is kept high despite the high passage rates of the dichloroethane vapors. It is thus possible to run the process at a temperature of the heating fluid (mercury) which is only 40–50° C. higher than the temperature of the dichloroethane vapors. By maintaining such a close control, overheating is avoided and consequently the production of carbon black and metallic chlorides is minimized.

The high coefficient of thermal efficiency achieved also permits high flow rates of dichloroethane vapors through the reactor pipes, thus minimizing the contact time for the pyrolysis and thereby improving the thermal transfer coefficient and preventing the deposit of carbon black. Further, the time at pyrolysis temperature because of such high flow rates is minimized.

The uniform temperature of all the reactor tubes is assured by the fact that the heat transfer is obtained by condensing mercury vapors. This allows the reaction to be carried out in an isothermal manner and to avoid local overheating inasmuch as the tube temperature cannot exceed the temperature of the condensing mercury. Further, the temperature of the mercury is chosen so as to minimize, to industrially acceptable limits, the corrosion rate on the metals which constitute the tubes of the reactors.

A prime advantage of the use of mercury as a heat transfer medium is that it permits a realization of the reactors in their most suitable form. Since the reactor is no longer restricted to the requirement that the tubes within which the reaction takes place be contained within the walls of the combustion chamber, the tubes can be arranged in such a fashion as to simplify inspection and cleaning thereof. Such arrangement also simplifies the pyrolysis run by permitting the vapors of dichloroethane being pyrolyzed to be maintained at the reaction temperatures for minimum times only.

Since the primary thermal exchange no longer takes place in the combustion chamber but in the external pyrolysis devices, the combustion chamber being mercury-heated at high thermal efficiencies can be given a far smaller size than heretofore required.

The possibility of forming amalgams with metals increases in accordance with an exponential law when the temperature and pressure of the mercury gases increase. To minimize resulting detriments, the mercury vapors according to the invention are produced at two different temperatures (hence at two different pressures) and the mercury is employed at high temperature and high pressure only where it is strictly needed, namely in the reactors themselves. Furthermore, the cracking temperature is lowered by the addition of oxidizing substances to the dichloroethane to values whereby the strength of the tube materials is not impaired.

From another aspect, it is also an advantage of the invention that the preheating of the dichloroethane vapors is effected with low-temperature mercury vapors. In this fashion, the mercury is utilized in the preheaters at a temperature where it is at a low pressure and its corrosive action, either on the metal walls from which it receives the heat or the ones whereto it transfers the heat, is practically nil. Moreover, a temperature limit for the dichloroethane vapors is established by the temperature of the condensing mercury which cannot be exceeded and which prevents the formation of carbon black and admits the dichloroethane to the mixer and then to the reactors in a state of incipient decomposition at a temperature ready for the cracking reaction.

To afford adjusting the conditions of the dichloroethane vapors at the end of the preheating stage to just the state of incipient pyrolysis with only slight formation of hydrochloric acid, the preheating is carried out in two distinct preheaters, denoted in the drawing by S1 and S2. These devices, both heated with mercury vapors at the lower temperature range, show different characteristics. The first step of preheating, involving no danger of any carbon black formation, is carried out in preheater S1 where the gas is passed with large specific delivery; the second step when the cracking or pyrolysis temperatures are approached and carbon black may be formed is carried out in preheater S2 where the specific delivery is lower than in preheater S1. The pipes of preheater S2 are filled with spheres in order to increase the surface with which the dichloroethane comes into contact and to inhibit the pyrolysis reaction by recourse to the so-called "wall-effect."

The construction of the reactors in a plurality of similar units allows the gases not only to become homogenized when they leave one unit to enter a subsequent one, but also permits the cleaning of an occasionally obstructed reactor unit without completely disassembling the entire complex of the apparatus.

The dichloroethane pyrolysis process of the invention has been carried out with an apparatus as described above having the following characteristics:

High-pressure mercury boiler: Pressure 9–13 atm., temperature 520–550° C.

Low-pressure mercury boiler: Pressure 2–5 atm., temperature 420–470° C.

Dichloroethane vapor pressure: 1–4 atmospheres.

First preheater: Inlet dichloroethane temperature, 100–160° C.; dichloroethane specific delivery, 70,000–100,000 kg./h. m.$^2$, Second preheater: Outlet dichloroethane temperature, 300–400° C.; dichloroethane specific delivery, 10,000–50,000 kg./h. m.$^2$, Reactors: Four in series; pyrolyzing dichloroethane temperature 400–500° C.; dichloroethane specific delivery, 60,000–180,000 kg./h. m.$^2$.

Only a very small amount of carbon black and pitch deposits has been noticed (0.04% by weight based on converted dichloroethane). The degree of conversion (ratio between converted dichloroethane and fed dichloroethane) has attained values of about 65%. The yield (ratio between dichloroethane converted to vinyl chloride and total converted dichloroethane) was 94–96%, and the consumption of the oxidizer injected into the mixer was very low (0.2–0.3% of the dichloroethane feed).

Maintenance proved to be simple. Intervention into the reactors to remove obstructions was needed only after long periods of operation. Control and operational flexibility were afforded with exceptional ease.

The vinyl chloride produced according to the invention showed polymerization rates of the same order as those of vinyl chloride obtained from acetylene. There was no need to subject it to special purification since those impurities which tend to decrease the polymerization rate of vinyl chloride were absent. Due to the absence of overheating, the metal chlorides present in the unconverted dichloroethane did not exceed 0.004 g./kg. at which concentration they were not deleterious.

The above-stated conditions and the arrangement of the apparatus are given by way of example and are not intended as limiting either in the exact temperature ranges or in the exact disposition of the apparatus or its components.

I claim:

1. Apparatus for pyrolysis of dichloroethane comprising preheaters $S_1$, $S_2$ for bringing the dichloroethane vapor to the state of incipient decomposition, a reactor R, wherein pyrolysis occurs, a low temperature boiler BP containing mercury and a high temperature boiler AP containing mercury for producing mercury vapors of respectively different pressures, a combustion chamber CB for heating both said boilers, which is supplied with fuel through a control valve $V_1$, a stack F through which the combustion gases leave said combustion chamber, air cooled condensers $C_1$, $C_2$, conduit means connecting said low-temperature boiler BP with said preheaters $S_1$, $S_2$ and conduit means connecting said high temperature boiler AP with said reactors R for transmitting heat from said heating means through the mercury vapors to said preheaters $S_1$, $S_2$ and reactors R respectively and said air-cooled condensers $C_1$, $C_2$ connected in said respective conduit systems for starting up the respective boilers and for temperature and pressure adjustment achieved by producing in the boilers AP and BP a slight excess of vapor and by conveying said excess to the respective condensers, wherein an air delivery is passed which in the high-pressure condenser is maintained at a constant value, air-admittance control valves $V_2$, $V_3$, said air-admittance control valves $V_2$, $V_3$, connected with respective condensers $C_1$, $C_2$, said heating means having a fuel-supply control valve $V_1$, a controller $PC_1$ responsive to the vapor pressure in high-temperature boiler AP and connected to fuel-supply control valve $V_1$ for controlling the latter whereby, when the air-admittance control valve $V_3$ for condenser $C_1$ connected with high-temperature boiler AP is set for producing a slight excess vapor pressure in the high temperature boiler, the fuel supply-control valve $V_1$ is controlled to regulate the pressure in high-temperature boiler AP, another controller $PC_2$ connected to the low-temperature boiler BP and responsive to the vapor pressure in said boiler, the controller $PC_2$ being connected to the air-admittance control valve $V_2$ for controlling it to regulate the pressure in said low-temperature boiler BP, a mixer M interposed between preheaters $S_1$, $S_2$ and reactors R for injecting oxidizing fluid into the preheated dichloroethane vapors prior to their entering into reactors R, said dichloroethane preheaters comprising at least two preheating devices $S_1$, $S_2$ connected in sequence, the subsequent device $S_2$ having a specific delivery of dichloroethane lower than the preceding heating device $S_1$ and the subsequent device $S_2$ having preheater tubes containing filler bodies to increase the active surface area for improving thermal exchange and inhibiting premature reactions.

2. Apparatus for pyrolysis of dichloroethane comprising preheaters $S_1$, $S_2$ for bringing the dichloroethane vapor to the state of incipient decomposition, a reactor R, wherein pyrolysis occurs, a low temperature boiler BP containing mercury and a high temperature boiler AP containing mercury for producing mercury vapors of respectively different pressures, a combustion chamber CB for heating both said boilers, which is supplied with fuel through a control valve $V_1$, a stack F through which the combustion gases leave said combustion chamber, air-cooled condensers $C_1$, $C_2$, conduit means connecting said low-temperature boiler BP with said preheaters $S_1$, $S_2$, and conduit means connecting said high temperature boiler AP with said reactors R for transmitting heat from said heating means through the mercury vapors to said preheaters $S_1$, $S_2$ and reactors R respectively, and said air-cooled condensers $C_1$, $C_2$ connected in said respective conduit systems for starting up the respective boilers and for temperature and pressure adjustment achieved by producing in the boilers AP and BP a slight excess of vapor and by conveying said excess to the respective condensers, wherein an air delivery is passed which in the high-pressure condenser is maintained at a constant value, air admittance control valves $V_2$, $V_3$, said air admittance control valves $V_2$, $V_3$ connected with respective condensers $C_2$, $C_1$, said heating means having a fuel-supply control valve $V_1$, a controller $PC_1$ responsive to the vapor pressure in high-temperature boiler AP and connected to fuel supply control valve $V_1$ for controlling the latter whereby, when the air admittance control valve $V_3$ for condenser $C_1$ connected with high-temperature boiler AP is set for producing a slight excess vapor pressure in the high-temperature boiler, the fuel supply control valve $V_1$ is controlled to regulate the pressure in high-temperature boiler AP, comprising another controller $PC_2$ connected to the low-temperature boiler BP and responsive to the vapor pressure in said boiler, the controller $PC_2$ being connected to the air admittance control valve $V_2$ for controlling it to regulate the pressure in said low-temperature boiler BP, said dichloroethane preheaters comprising at least two preheating devices $S_1$, $S_2$ connected in sequence, the subsequent device $S_2$ having a specific delivery of dichloroethane lower than the preceding heating device $S_1$ and the subsequent device $S_2$ having preheater tubes containing filler bodies to increase the active surface area for improving thermal exchange and inhibiting premature reactions.

References Cited by the Examiner
UNITED STATES PATENTS

| | | | |
|---|---|---|---|
| 1,719,235 | 7/1929 | Pew et al. | 122—33 |
| 2,196,229 | 4/1940 | Prickett | 23—288 |
| 2,724,006 | 11/1955 | Krekeler | 260—656 |
| 2,875,255 | 2/1959 | Eberly | 260—656 |
| 2,981,764 | 4/1961 | Bihan et al. | 260—656 |
| 3,119,671 | 1/1964 | Koniewiez et al. | 23—277 |
| 3,129,065 | 4/1964 | Koniewiez | 23—277 |

MORRIS O. WOLK, *Primary Examiner.*

LEON ZITVER, JAMES H. TAYMAN, Jr., K. V. ROCKEY, *Assistant Examiners.*